Figure 1:
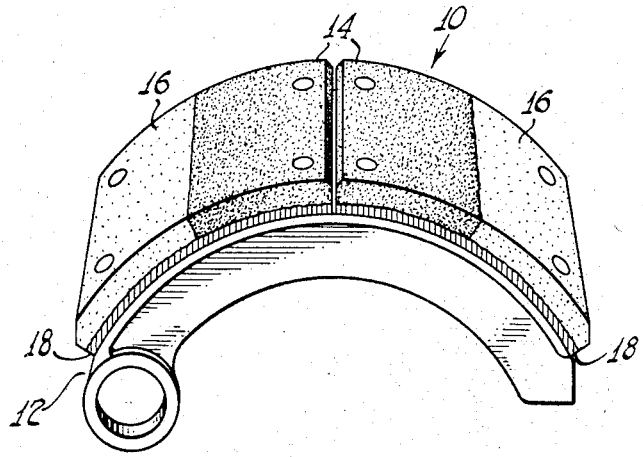

Aug. 8, 1944.  D. S. BRUCE  2,355,419

COMPOSITE BRAKE LINING

Filed Nov. 4, 1942

INVENTOR
DONALD S. BRUCE.
BY Virgil C Kline
ATTORNEY

Patented Aug. 8, 1944

2,355,419

UNITED STATES PATENT OFFICE 2,355,419

COMPOSITE BRAKE LINING

Donald S. Bruce, Somerville, N. J., assignor to Johns-Manville Corporation, New York, N. Y., a corporation of New York Application November 4, 1942, Serial No. 464,459

4 Claims. (Cl. 188—251)

This invention relates to a composite brake lining, and more particularly to an improved composite friction facing for a pivoted arcuate brake shoe.

An object of the invention is to provide a friction facing for an arcuate brake shoe which will have an effective and smooth braking action and which shall be durable and have a minimum tendency to develop objectionable squealing noise under applied braking pressure between the shoe and drum.

A general characteristic of brake linings or facings of the type now commonly used for the wheels of automotive vehicles, and particularly the brake linings of heavy vehicles such as buses, is that such linings quickly develop in use non-uniformity of braking action and vibration squealing. Such defective operation of brakes of this type when equipped with conventional friction facings or linings apparently results primarily from non-uniformity of contact and variations of pressure pattern over the entire area of braking surface between the drum and the friction facing of the arcuate shoe. While the metal drum is solidly anchored to the wheel, there is nevertheless a tendency toward distortion; and while the heel of the shoe is also rigidly anchored by a pivotal mounting on a bearing-journaled operating shaft, the toe of the shoe is unanchored, and the centers of curvature of the contact surfaces of the shoe and drum are seldom coaxial, because of unequal expansion and contraction of these two elements and uneven wear of friction face over entire arc. When application of braking pressures result in squealing noises which are developed by vibrations set up in the brake shoe and brake drum, clear evidence is afforded of uneven application of braking pressure and uneven development of frictional resistance over the entire area of the braking surface between the drum and the shoe facing.

The composite brake shoe facing which forms the subject of the present invention is based on the discovery that when the heel and toe sections of a brake shoe are faced with friction material having a lower wear resistance than is possessed by the friction facing of the central portion of the shoe, any tendency of the resulting brake to develop objectionable squealing is minimized and substantially eliminated. The invention consists essentially of a segmental friction facing for a pivoted arcuate brake shoe comprising a plurality of sheet or block facing segments of different wearing properties assembled in radially spaced relation on the shoe face, with the facing segments of lower durability or wearing resistance applied to the heel and toe of the shoe, while the central area of the shoe is faced with a segment or segments of higher wearing resistance. Thus, whereas brake shoe facings at present commonly in use have uniform durability and wear resistance over the entire shoe face, the heel and toe segments of the multiple segment brake shoe facing herein described have a lower wear resistance than the centrally disposed facing segment, thereby minimizing any tendency to develop high frictional resistance at points adjacent the ends of the shoe, and substantially eliminating brake squeal by removing or reducing the principal cause of noise promoting vibrations.

With the above and other objects and features in view, the invention consists in the improved segmental brake shoe facing which is hereinafter described and more particularly defined in the claims.

Figure 2:
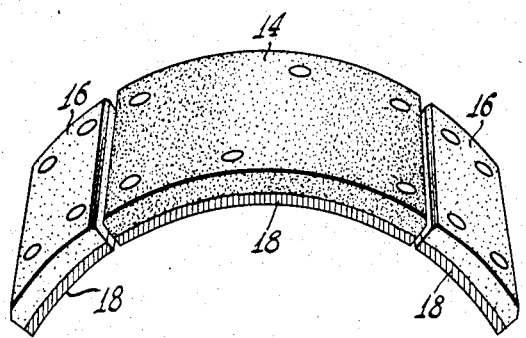

In the accompanying drawing, in which preferred embodiments of the invention are illustrated and wherein like reference characters designate like parts:

Fig. 1 shows in perspective a preferred arrangement of brake shoe facing segments of high and low wearing resistance on a pivoted arcuate brake shoe; and Fig. 2 illustrates in perspective a modification in arrangement of the facing segments of high and low wearing properties.

In the preferred embodiment of the invention which is illustrated in Fig. 1, numeral 10 designates an arcuate brake shoe of conventional design adapted for pivotal operation by means of a shaft (not shown) by which the shoe is rigidly anchored at its heel end 12. Numerals 14 designate radially spaced block segments of friction material of relatively good wearing properties which are disposed as friction facings on the middle portion of the braking surface of the shoe. Numerals 16 designate blocks or segments of friction material of relatively poor wear resistance which are disposed at radially spaced points on the braking face of shoe 10 over the toe and heel ends of the shoe, respectively. In Fig. 2, segments 14 and 16 are illustrated as of substantially equal area and as mounted in pairs on backing or supporting layers 18 which may be composed of fibro-cementitious sheets of high strength and relatively low wear resistance. In the arrangement shown in Fig. 1, each supporting layer 18 carries on its face one segment 14 of high wear resistance and one segment 16 of low wear resistance. Thus in Fig. 1 the brake shoe is faced with two arcuate friction brake blocks of identical curvature, each block being mounted on the face of the shoe so that the friction segments 14 of high wear resistance are both positioned in adjacent tandem grouping over the central portion of the brake-shoe facing. In the arrangement of Fig. 2, the central portion of the illustrated brake lining consists of a facing segment 14 having an area more than twice that of each of the segments 14 shown in Fig. 1;

while the end portions of the lining which are arranged for facing the heel and toe of the shoe are smaller segments 16 of lower wear resistance.

To illustrate what is meant by the expressions "high-wear resistance" and "low-wear resistance," the following formulas for compositions of blocks 14 and 16 are given by way of example. Blocks or segments 14 of high wear resistance may comprise approximately 48% reinforcing asbestos fibres; approximately 30% friction particles which may, for example, be granulated reclaimed scrap rubber; approximately 10 parts hard friction materials such as granulated brass, copper or zinc; and approximately 12 parts of binder which may be a phenol-aldehyde condensation product. A pressure molded and heat-cured mixture of this character has a rate of wear of approximately .003 cubic inch/H. P./hr. by standard testing methods at a test temperature of approximately 350° F.

A composition suitable for segments or blocks 16 of lower wear resistance may be approximately 63 parts asbestos fibre; approximately 15 parts friction particles such as granulated scrap rubber; approximately 10 parts granulated brass or other hard friction particles, and 12 parts phenol-aldehyde resin binder. By standard wear-testing methods at a test temperature of 350° F. a pressure-cured and heat-hardened block of this composition has been found to have a wear factor of .005 cubic inch/H. P./hr.

Brake blocks of the type illustrated in Fig. 1 may be manufactured substantially as follows: A suitable composition for the backing layer 18 is first prepared and may consist of approximately 85% asbestos and 15% of "B-stage" phenol-aldehyde condensation product. After thoroughly mixing the ingredients for the layer 18, the mixture is sheeted out or otherwise shaped to suitable dimensions and the resultant sheet 18 is laid out while in plastic state on the bottom of an arcuate mold. A partition of light cardboard, or equivalent, is next disposed centrally and vertically in the mold above the plastic sheet 18, and the two sections of the mold on each side of the partition are filled to predetermined depth respectively with the plastic molding mixtures previously suggested for the high-wear resistance segments 14 and the low-wear resistance segments 16. After removal of the partition, the uncured and plastic block is hardened and cured within the mold by simultaneous application of high temperature and pressure. Such curing may, for example, take place under a pressure of 2000 lbs. per square inch at a temperature equivalent to the temperature of steam at 90 lbs. pressure. In this manner, the block is molded to suitable dimensions and curvature, and the various component segments are bonded to each other to form a unitary block.

Experience in the operation on city streets of buses equipped with differential wear segment brake blocks arranged as herein described, shows that such blocks will at least equal in durability other blocks of uniform composition having wearing qualities the same as the wearing qualities of the high wear resistance units 14; and that such segmental blocks will operate throughout their life without developing objectionable brake squealing. In the brake blocks thus tested, the poor wear facing segments affixed at the toe and heel ends of the brake shoe had approximately the same combined area as the good wear segments 14 affixed to the central portion of the brake shoe face in the manner illustrated.

Experiments indicate that the combined area of the poor wear friction segments 16 may be substantially less than the combined area of the good wear segments and still give satisfactory results. However, it is believed that the combined area of the poor wear segments should not be less than 60% of the combined area of the good wear segments for smooth braking action. Experience has also shown that the differential in wearing qualities between the poor wear segments 16 and the good wear segments 14 may be considerably varied, but that the differential should not be substantially less than 5/3, or in other words, the wear factor of the good wear material should not be substantially less than 50% of the wear factor of the poor wear segments for a brake lining of suitable durability.

In the examples which have been given of suitable compositions of the poor and good wear brake linings segments 16 and 14, it will be noted that both stated compositions contain the same proportion of hard friction particles, and the difference in wearing characteristics is obtained by changing the proportions of friction particles and asbestos. By employing the same proportion of hard friction particles in both compositions, there is imparted to the respective segments 16 and 14 a high coefficient of friction and stability of such friction coefficient over a wide range of operating temperatures. While a thermo-setting resin of the phenol-aldehyde type is a preferred bonding agent for such composite brake linings, other bonding agents may be employed, as for example, rubber or rubber substitutes of the type of polymerized chloroprene.

Since many variations may be made from the illustrative details given, without departing from the scope of the invention, it is intended that the invention should be limited only by the terms of the claims interpreted as broadly as consistent with novelty over the prior art.

What I claim is:

1. A composite friction facing for a pivoted arcuate brake shoe comprising, a plurality of radially spaced segments of heat and pressure hardened fibro-cementitious friction sheets of differential wearing properties, the segments of low wear resistance being assembled as facings for the heel and toe portions of the shoe and the segments of high wear resistance forming the facing of the central portion of the shoe.

2. A segmental friction facing for a pivoted arcuate brake shoe comprising, a plurality of facing segments of differential wearing properties arranged in radially spaced relation with the segments of lower wear resistance disposed as facings for the heel and toe portions of the shoe, and with the facing segments of high wear resistance forming the facing for the central portion of the shoe.

3. A segmental friction facing for a pivoted arcuate brake shoe as defined in claim 2 in which the combined area of the facing segments of low wear resistance does not exceed the combined area of the segments of high wear resistance.

4. A segmental friction facing for a pivoted arcuate brake shoe as defined in claim 2 in which the wear factor of the segments of high wear resistance is at least 50% of the wear factor of segments of low wear resistance, and in which all segments have a high coefficient of friction and stability of such friction coefficient over a wide range of operating temperatures.

DONALD S. BRUCE.